United States Patent
Brown

(10) Patent No.: US 8,056,960 B2
(45) Date of Patent: Nov. 15, 2011

(54) SIDEWALL ASSEMBLY HAVING COMPOSITE PANELS FOR TRAILERS AND VANS

(75) Inventor: Donald Brown, Jonesboro, AR (US)

(73) Assignee: Manac Trailer USA, Inc., Oran, MO (US)

( * ) Notice: Subject to any disclaimer, the term of this patent is extended or adjusted under 35 U.S.C. 154(b) by 176 days.

(21) Appl. No.: 12/378,817

(22) Filed: Feb. 19, 2009

(65) Prior Publication Data
US 2009/0273205 A1    Nov. 5, 2009

Related U.S. Application Data

(63) Continuation of application No. 11/301,353, filed on Dec. 12, 2005, now abandoned.

(60) Provisional application No. 60/635,145, filed on Dec. 10, 2004.

(51) Int. Cl.
*B62D 33/04* (2006.01)
(52) U.S. Cl. ............... 296/186.1; 296/181.3; 296/182.1
(58) Field of Classification Search ............... 296/181.3, 296/181.6, 182.1, 186.1; 52/464, 459
See application file for complete search history.

(56) References Cited

U.S. PATENT DOCUMENTS

| | | | |
|---|---|---|---|
| 3,393,920 A | 7/1968 | Ehrlich | |
| 4,357,047 A * | 11/1982 | Katz | 296/186.1 |
| 5,507,405 A | 4/1996 | Thomas et al. | |
| 5,509,714 A * | 4/1996 | Schmidt | 296/186.1 |
| 5,664,826 A | 9/1997 | Wilkens | |
| 5,992,117 A | 11/1999 | Schmidt | |
| 6,003,932 A * | 12/1999 | Banerjea et al. | 296/186.1 |
| 6,010,020 A | 1/2000 | Abal | |
| 6,505,883 B1 | 1/2003 | Ehrlich | |
| 6,527,335 B1 | 3/2003 | Yurgevich | |
| 6,578,902 B2 | 6/2003 | Sill | |
| 6,626,622 B2 | 9/2003 | Zubko | |
| 6,652,018 B2 | 11/2003 | Buchholz et al. | |
| 6,824,341 B2 | 11/2004 | Ehrlich | |
| 6,832,808 B1 | 12/2004 | Bennett | |
| 6,986,546 B2 | 1/2006 | Ehrlich | |
| 7,014,253 B2 | 3/2006 | Oren | |
| 7,025,408 B2 | 4/2006 | Jones et al. | |
| 7,114,762 B2 * | 10/2006 | Smidler | 296/186.1 |
| 2002/0109377 A1 | 8/2002 | Ehrlich | |
| 2002/0180238 A1 | 12/2002 | Sill | |
| 2004/0232728 A1 | 11/2004 | Smidler | |
| 2006/0061136 A1 | 3/2006 | Pines | |
| 2006/0071507 A1 | 4/2006 | Graaff et al. | |
| 2006/0290170 A1 | 12/2006 | Brown | |
| 2007/0110538 A1 | 5/2007 | Roush et al. | |
| 2009/0026215 A1 | 1/2009 | Roush et al. | |

* cited by examiner

*Primary Examiner* — Jason S Morrow
(74) *Attorney, Agent, or Firm* — Armstrong Teasdale LLP

(57) ABSTRACT

A sidewall assembly for a trailer or van having a plurality of composite panels interconnected along the length of the trailer. The composite panels have a polyurethane core sandwiched between inner and outer metal panels in bonded relationship. The composite panels are affixed to a respective hat-shaped inner side post between adjacent vertical ends of the composite panels. A plurality of vertically arranged rivets affixes the composite panel to inner post and to an outer sidepost.

12 Claims, 7 Drawing Sheets

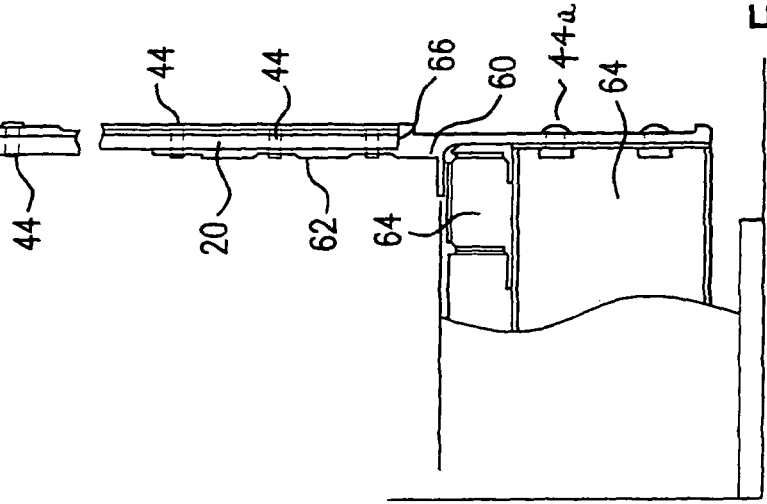
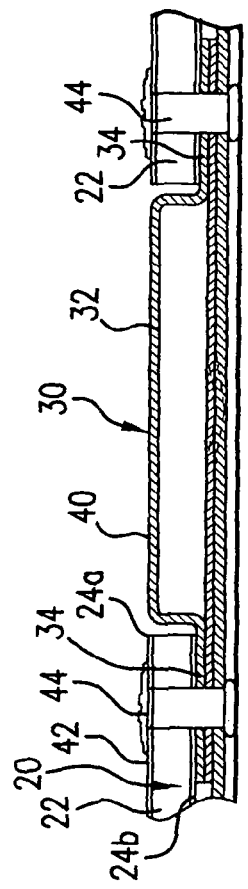
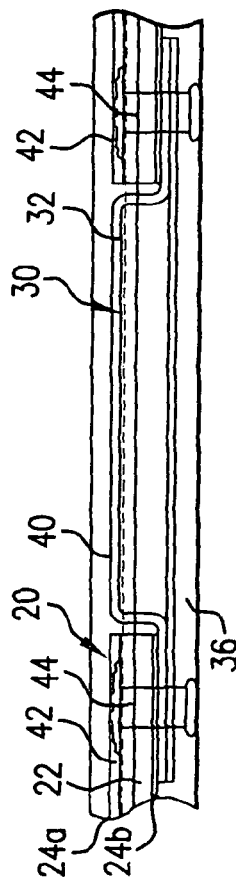
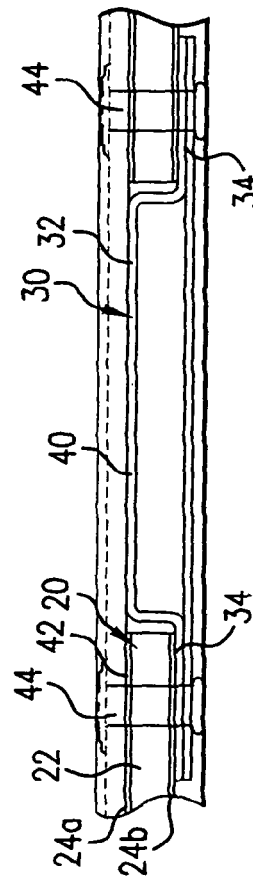

SIDEWALL ASSEMBLY HAVING COMPOSITE PANELS FOR TRAILERS AND VANS

This application is a continuation of non-provisional application, Ser. No. 11/301,353 filed Dec. 12, 2005, now abandoned, which in turn claimed priority to provisional application, Ser. No. 60/635,145 filed Dec. 10, 2004.

BACKGROUND OF THE INVENTION

1. Field of the Invention

This invention relates in general to trailers and, more particularly, to a trailer having a sidewall assembly including composite panels interconnected by side posts.

2. Summary of the Prior Art

A common form of a cargo carrying trailer or van relies on a sheet and post design for its sidewall construction. Known sheet and post designs employ a plurality of hat-shaped side posts to which outer and inside metal side sheets are riveted by a vertical array of rivets. Such sheet and post trailers do not optimize interior cargo space because of the width of the sidewall structure. Many prior attempts to reduce the thickness of the sidewall of a trailer have suffered from several disadvantages, including extra weight, higher repair costs and designs that are not optimally strong under all loading conditions. Prior art post and sheet sidewall constructions are also not efficiently durable and are not economical to manufacture and repair. Accordingly, it is desirable to provide a trailer having a sidewall assembly that is economical to manufacture and to operate, is durable during use, and provides a reduced sidewall thickness to increase cargo space and reduce weight.

SUMMARY OF THE INVENTION

It is an objective of this invention to provide a trailer having a sidewall assembly formed of a plurality of composite panels that reduce the thickness and weight of the side structures. The composite panels of the invention comprise a polyurethane core thermally bonded to inner and outer metal panels or skins. The edge portions of each of the composite panels are respectively riveted to a plurality of side posts having a hat-shaped sectional cross section and to outer posts. The inner surface created by the composite panels and the intervening surfaces of the side posts create a generally smooth and snag free surface. The sidewall assembly herein disclosed is strong, durable, and lightweight, and is easily repaired.

BRIEF DESCRIPTION OF THE DRAWINGS

FIG. 4 is a partial top plan view, with parts in section, of the first embodiment of the sidewall assembly of the invention at the upper side rail;

FIG. 5 is a partial top plan view, with parts in section, of the sidewall assembly of the invention at an outer side post;

FIG. 6 is a partial top plan view, with parts in section, of the first embodiment of the sidewall assembly of the invention at the lower side rail;

FIG. 7 is an end elevational view, with parts in section, of the sidewall assembly of the invention as used in the trailer of FIG. 1;

DESCRIPTION OF THE PREFERRED EMBODIMENTS

Figure 1:
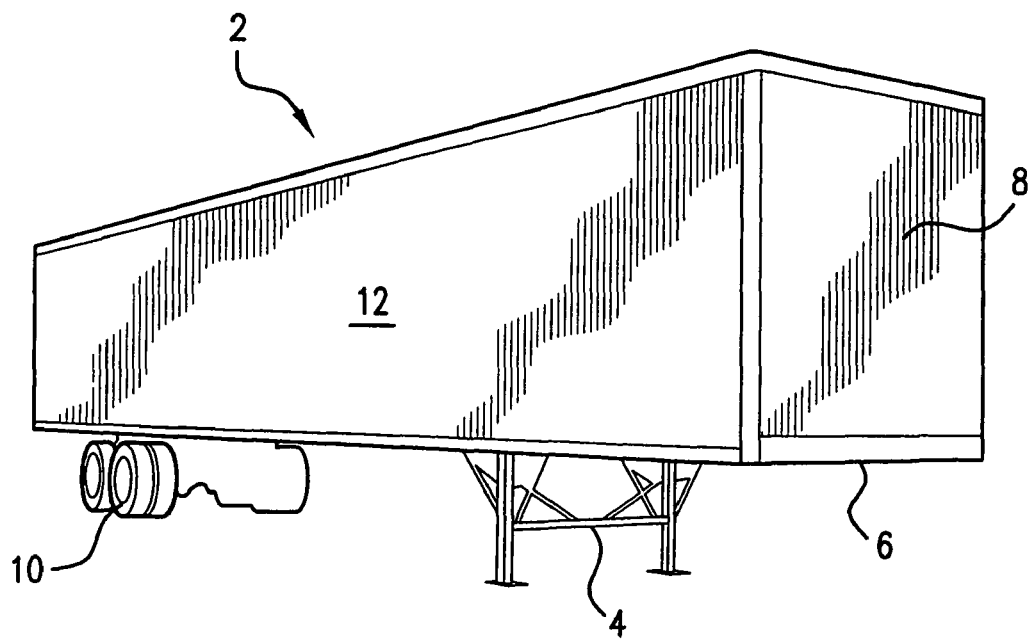
FIG. 1 is a perspective view generally showing one type of trailer that includes the features of the present invention.
Figure 2:
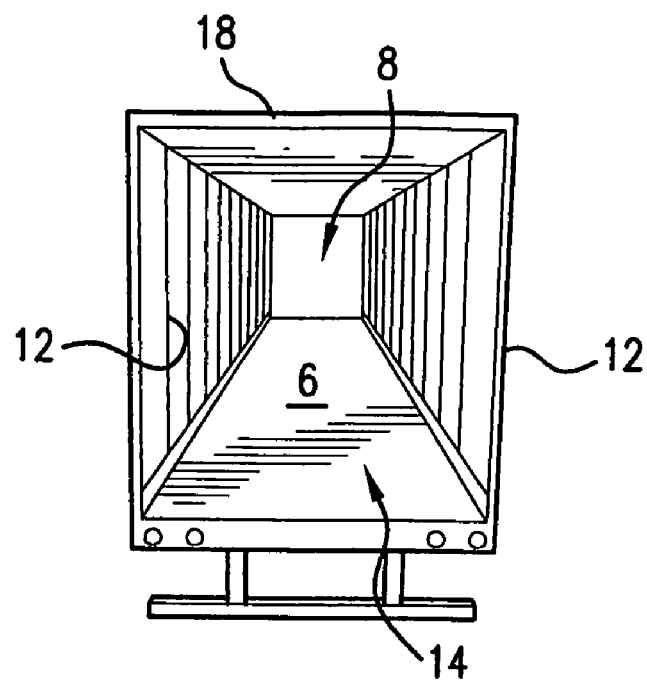
FIG. 2 is a rear perspective view of the interior of the trailer of FIG. 1.
Figure 3:
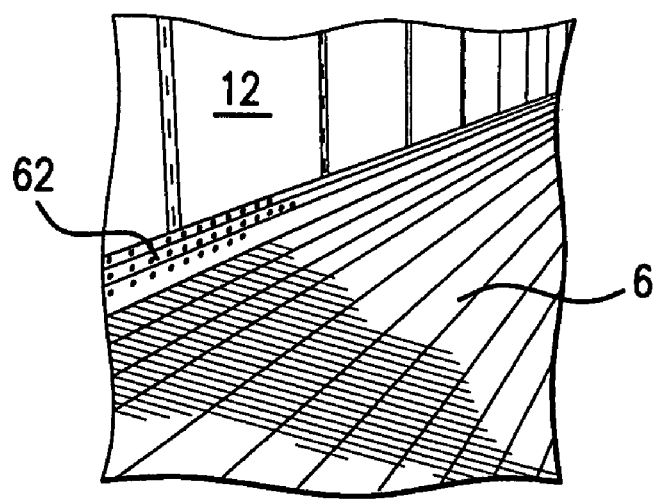
FIG. 3 is a side perspective view of the floor and sidewall assembly of the trailer of FIG. 1.

Referring now to FIG. 1-12, there is illustrated a first embodiment of the composite sidewall assembly of the invention to be described in detail herein. In FIG. 1, a general perspective view of a trailer embodying the teachings of the invention is shown. The present invention is not restricted to the particular trailer shown in FIG. 1, but more broadly relates to the construction of cargo containers, including, but not limited to, trailers, vans and the like. In FIG. 1, trailer 2 includes a standard landing gear 4, a floor 6 and a front wall 8. Conventional wheel assemblies 10 are provided at the rear of the trailer 2. The trailer is further provided with the sidewall assembly 12 of the invention to be described more fully herein. Referring to FIGS. 2 and 3, the interior cargo space 14 of the trailer 2 is defined by floor 16, sidewall assemblies 12 on opposite sides of trailer 2, roof 18 (FIG. 2), and front wall 8.

Referring now to FIGS. 4-11, details of the first embodiment of the composite wall assembly 12 of the present invention is best shown. In FIGS. 4, 5, 6, and 7, sidewall assemblies 12 include a plurality of vertically extending composite panels 20 substantially disposed longitudinally along the length of the sidewall assemblies 12. Each of the composite panels 20 have a flat, rectangular shape and include a non-metallic core 22, formed from polyurethane and the like, sandwiched respectively between prepainted inner and outer panels 24a and 24b. The panels 24a, 24b may be formed from steel or other strong, durable metal as desired. The panels 24a, 24b are thermally molecularly bonded to core 22 to ensure structural integrity of each composite panel 20 and the overall sidewall assembly 12. The panels 24a and 24b are advantageously painted white or other bright color to brighten the interior of space 14 and the exterior of trailer 2.

Adjacent vertical end portions 26 of composite panels 20 are interconnected as a sidewall unit by intervening metal inner side posts 30 vertically extending within cargo space 14 (FIGS. 2 and 3). The side posts 36 have a hat-shaped horizontal cross section forming a central 32 and opposite offset edge portions 34. The edge portions 34 are offset from central portions 32 by a distance approximately equal to the thickness of composite panel 20. The vertical end portions 26a of the composite panels generally overlap offset portions 34 in contacting relationship as seen in FIGS. 4-6. Outer posts 36 (FIGS. 5, 11 and 12) are mounted exteriorly over each of the inner posts 34 and includes a slight bulge 38 for strength. The outer surfaces of the offset portions 34 contact the inner surface of a respective outer post 36. The inner surface 40 of inner post 30 is generally vertically coplanar to the vertical inner surface 42 of panel 20 to form a generally continuous, snag proof surface. The edge portions of panel 20, edge portions 34 of inner side post 20 and the outer post 36 are interconnected as a durable and strong unit by rows of vertically extending arrays of rivets extending the height of sidewall assemblies 12. The central portion 32 of inner side posts 30 are spaced from outer posts 36.

Figure 8:
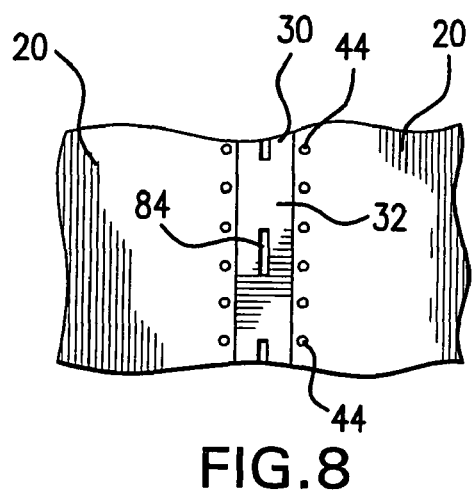
FIG. 8 is a partial side elevational view of a inside post connecting adjacent composite side panels of the sidewall assembly of the invention.
Figure 9:
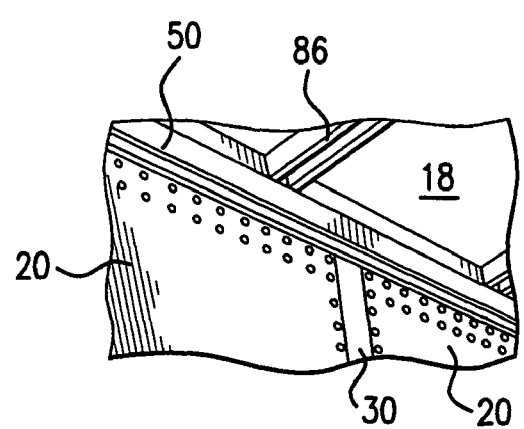
FIG. 9 is an upper perspective view of the intersection of roof and sidewall assembly of the invention.
Figure 10:
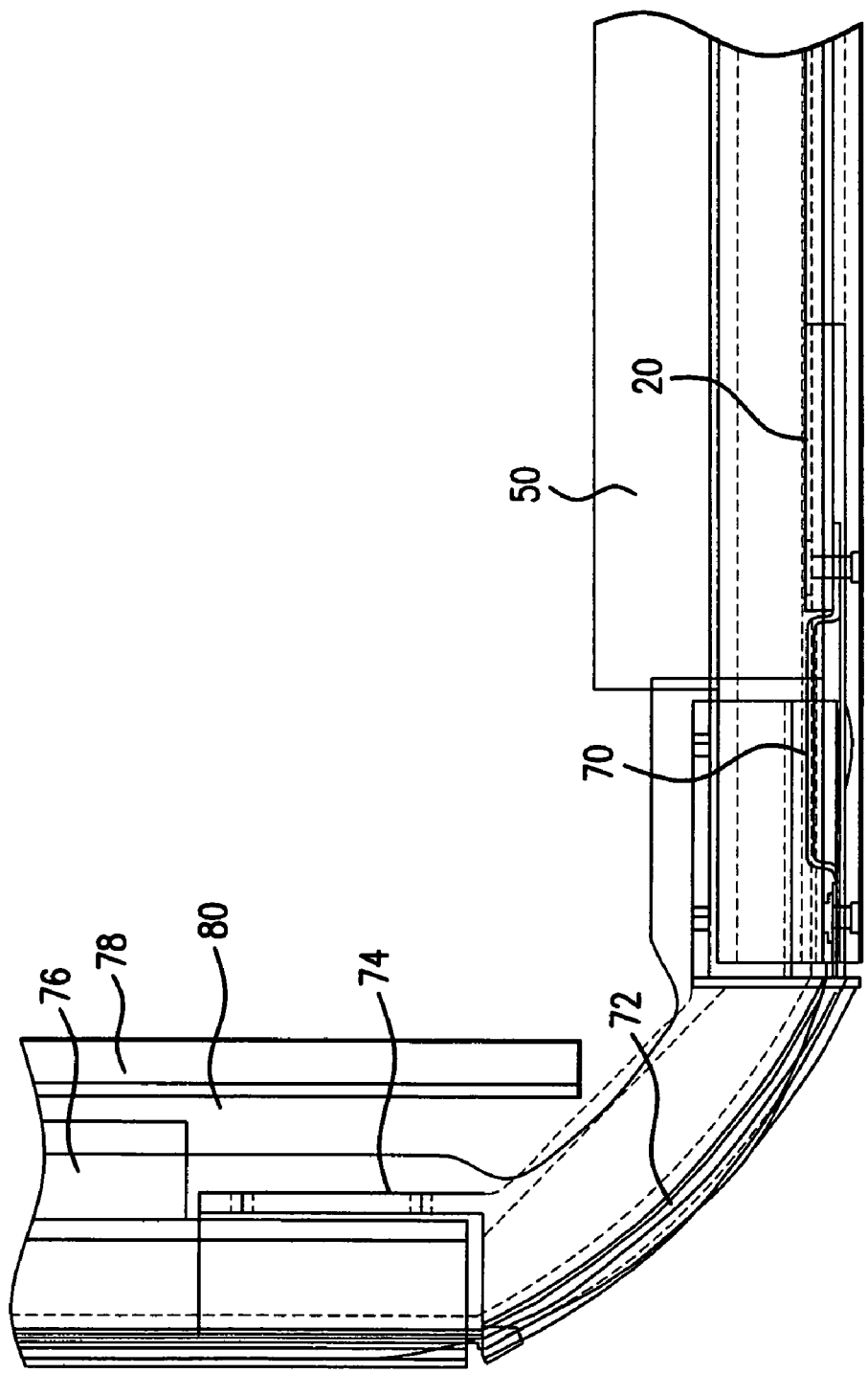
FIG. 10 is a partial top plan view, with parts in section, of the front corner of the trailer of FIG. 1.
Figure 11:
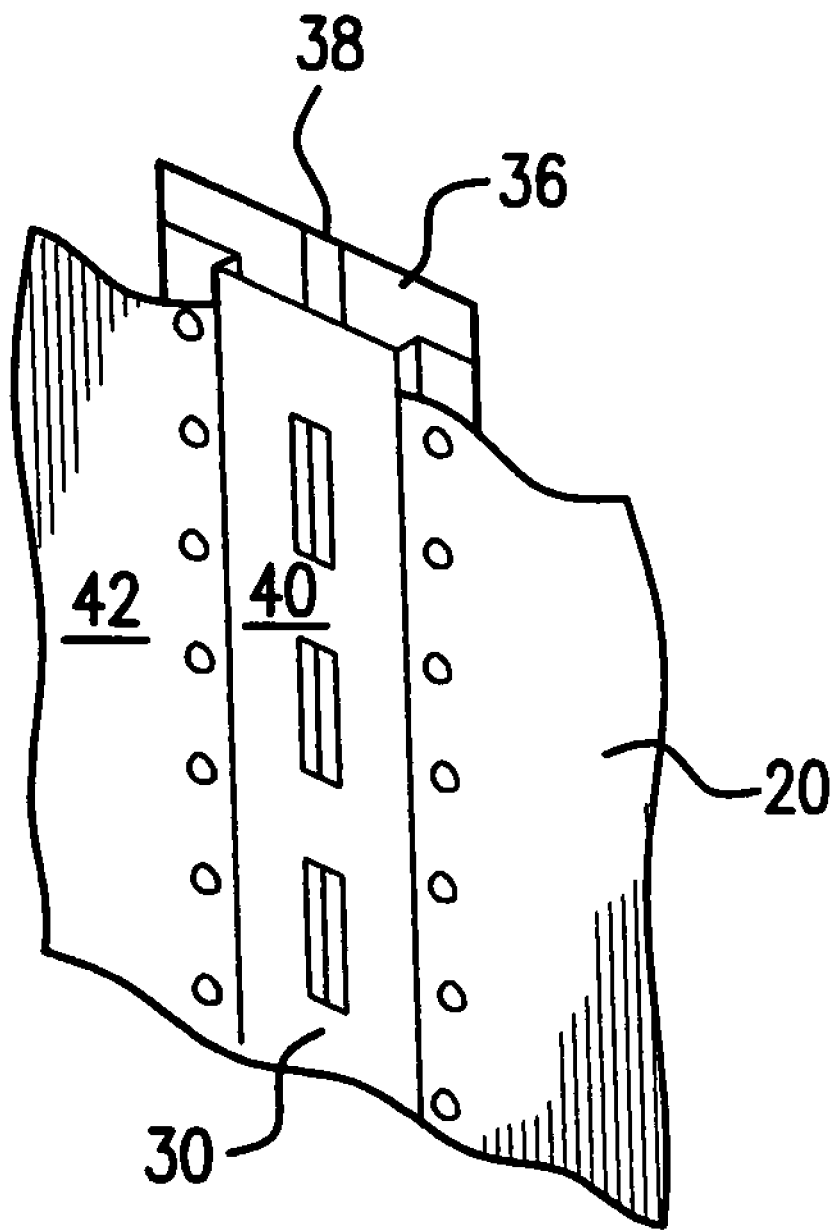
FIG. 11 is a side perspective view of the panels and inner and outer side posts of the first embodiment of the sidewall assembly of the invention.
Figure 12:
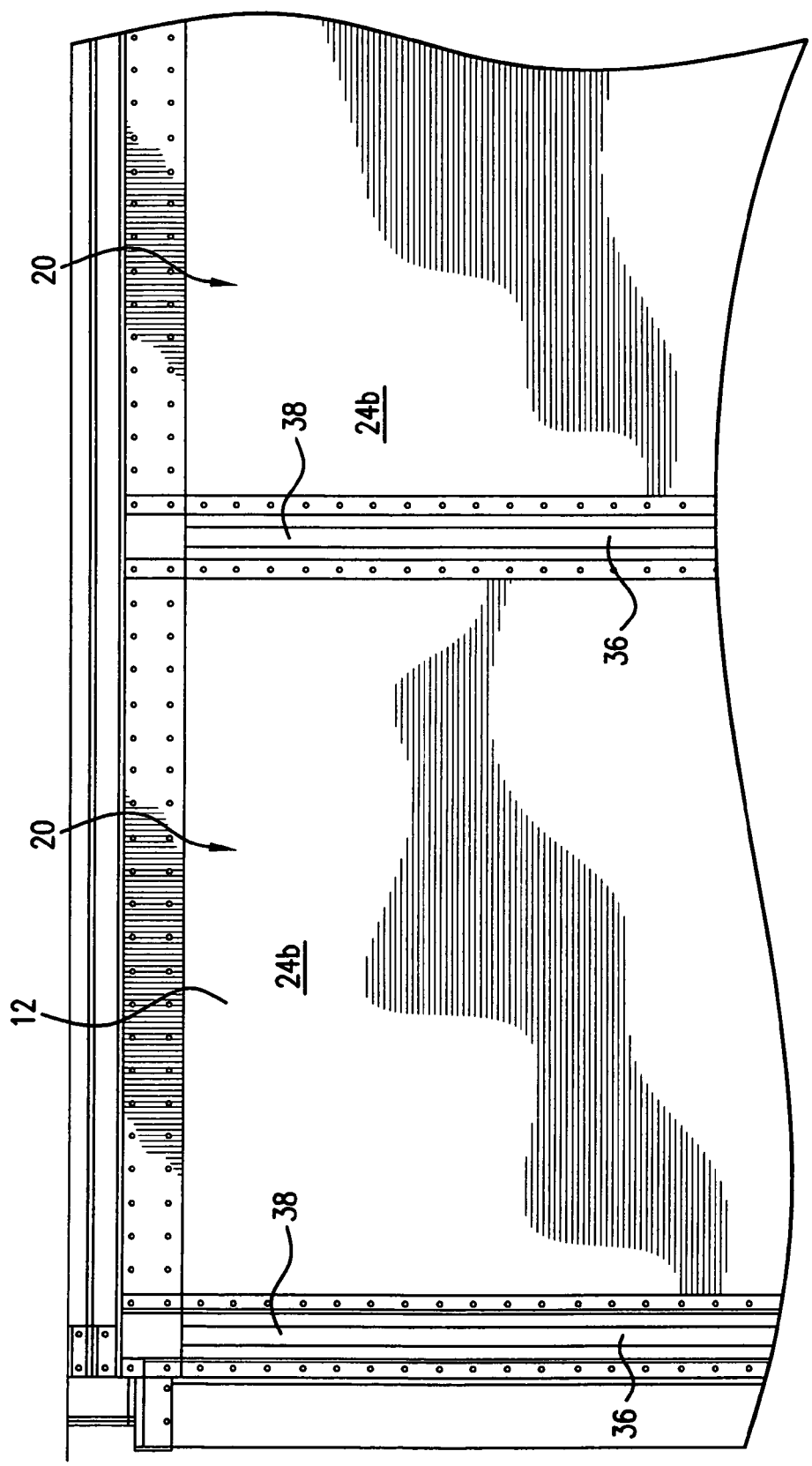
FIG. 12 is a partial side elevational view of the first embodiment of the sidewall assembly of the invention.

The upper portions 20a (FIG. 7) of panels 20 are attached to an upper rail 50 by rivets 52 extending through an overlap 54 of upper rail 50 and the panels 20. A standard roof and roof bow 56 are mounted on the upper rail 50. A bottom rail 60 is integrally attached to the side wall assembly 12 by rivets 44a and form lower interior scuff surface 62 (FIG. 3). A standard floor and cross member is affixed by rivets to the bottom rail 60. As should be apparent in FIG. 7, the panels 20 and inner posts 30 overlap the bottom rail 60 for a shingle style design at area 66. In FIG. 10, there is illustrated the front corner of trailer 2. The front composite panel 20 is riveted to the rear edge portion of a front hat-shaped post 70 below the upper sidewall rail 50. The post 70 is connected to radius extrusion 72 that is affixed to a corner casting 74. The front wall further includes an upper front rail 76, an interior bulkhead and front wall 78 and a front wall post 80. As shown in FIG. 8, the central portion of 32 of side posts has a series of vertical slots 84. In FIG. 9, the upper rail 50 interconnects with horizontal beams 86 of the roof.

Figure 14:
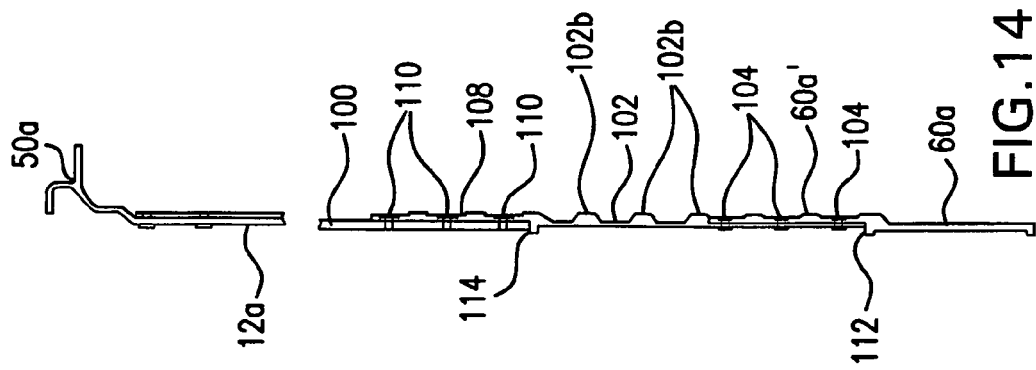
FIG. 14 is an end elevational view of the sidewall assembly of FIG. 13.
Figure 13:
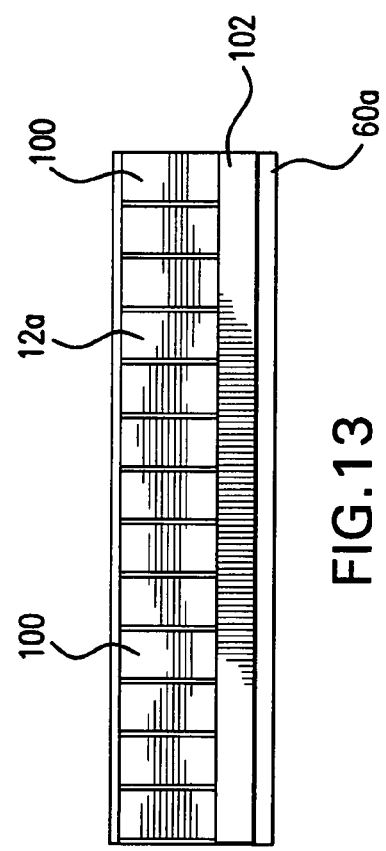
FIG. 13 is side elevational view of a second embodiment of the sidewall assembly of the invention.

Referring now to FIGS. 13-14, there is illustrated a second embodiment of the composite sidewall assembly of the invention, generally designated by reference numeral 12a. The sidewall assembly 12a includes composite panel assembly 100 of the same construction as described with reference to the first embodiment of FIGS. 1-12. The sidewall assembly 12a is further provided with a scuff plate 102 that is affixed by fasteners 104, such as three in number situated at a plurality of stations along the length of the sidewall assembly 12a, at its lower edge portion 106 to bottom rail 60a. The lower edge portion is situated exteriorly of the offset upper section 60a' of the bottom rail 60a. The upper portion 108 of scuff plate 102 is offset and extends in rear contacting relationship with the bottom of the side wall assembly 12a. The upper portion 108 is attached to the bottom of the side wall by an upper series of mechanical fasteners, such as three in number at each vertical location as shown in FIG. 14. The scuff plate 102 has a plurality of rear rib like projections 102b to strengthen the scuff plate and the sidewall assembly as a whole. The upper portion of the rail 60a is provided with a ledge 112 to interfit with the bottom edge of the scuff plate. A ledge 114 is formed on an upper portion of scuff plate 102 to contact the bottom of the sidewall assembly 12a. The scuff plate 102 provides a heavy duty structure that strengthens the sidewall and resists damage from external forces, such as, for example, from fork lifts and the like that typically lift trailers on and off railcars and other locations during use.

What is claimed is:

1. A sidewall assembly for a transporting vehicle comprising:
   a side wall including a plurality of composite panels having a non-metallic material imposed between a pair of sheets and extending vertically along a horizontal axis, said composite panels having vertical edge portions, a bottom edge, an interior surface, and an exterior surface,
   a plurality of inner side posts vertically positioned between adjacent pairs of said plurality of composite panels,
   said inner side posts having a generally hat-shaped horizontal cross-section forming a flat central portion and a pair of opposite edge portions forming inner surfaces and outer surfaces,
   a plurality of outer side posts being vertically positioned in generally contacting relationship with said outer surfaces of said plurality of inner side posts,
   mechanical fasteners for interconnecting said vertical edge portions of said plurality of composite panels, said edge portions of said plurality of inner side posts, and said plurality of outer side posts together as a unit with said vertical edge portions of said composite panels generally contacting said inner surfaces of said edge portions of said inner side posts and said outer surfaces of said inner side posts generally contacting a portion of said outer posts, and
   a bottom rail including an upper portion and a lower portion, said upper portion coupled to said interior surface of said composite panels and forming an interior scuff surface, said lower portion extending below said composite panels such that said lower portion of said bottom rail overlaps and is adjacent to said bottom edge of said composite panels.

2. The sidewall assembly according to claim 1 wherein each of said plurality of composite panels includes a non-metallic core sandwiched between a metal inner panel and a metal outer panel.

3. The sidewall assembly according to claim 2 wherein said non-metallic core is polyurethane.

4. The sidewall assembly according to claim 1 wherein said mechanical fasteners comprise a plurality of rivets.

5. The sidewall assembly according to claim 1 wherein said central portion and said composite panel form a flat, generally coplanar surface.

6. A sidewall assembly for a transporting vehicle comprising:
   a side wall having adjacent pairs of composite panels extending vertically along a horizontal axis, each of said adjacent pairs of said composite panels having end portions being spaced from each other and having outer surfaces, said adjacent pairs of composite panels having a bottom edge, an interior surface and an exterior surface,
   inner side posts respectively positioned vertically between said adjacent pairs of said composite panels, each of said inner side posts having opposed vertical edge portions for overlapping, contacting relationship with said outer surfaces of said end portions of each of said composite panels,
   outer side posts respectively positioned vertically in confronting relationship with said inner side posts,
   each of said opposed vertical edge portions of said inner side posts contacts said outer side posts, said opposed vertical edge portions positioned between said end portions of said composite panels and said outer side posts,
   mechanical fasteners for interconnecting said adjacent pairs of said composite panels, said inner side posts, and said outer side posts together as a unit, and
   a bottom rail including an upper portion and a lower portion, said upper portion coupled to said interior surface of said adjacent pairs of composite panels and forming an interior scuff surface, said lower portion extending below said adjacent pairs of composite panels such that said lower portion of said bottom rail overlaps and is adjacent to said bottom edge of said adjacent pairs of composite panels.

7. The sidewall assembly according to claim 6 wherein each of said composite panels includes a non-metallic core sandwiched between a metal inner panel and a metal outer panel.

8. The sidewall assembly according to claim 7 wherein said non-metallic core is polyurethane.

9. The sidewall assembly according to claim 6 wherein said opposed vertical edge portions of each of said inner side posts have vertically extending offset edge portions, said end portions of said composite panels overlap said offset edge portions in contacting relationship, each of said outer side posts respectively contacting said offset edge portions, and said mechanical fasteners extending through said offset edge portions and said end portions.

10. The sidewall assembly according to claim 9 wherein said mechanical fasteners comprise at least one vertical array of a plurality of rivets.

11. The sidewall assembly according to claim 10 wherein said inner side posts have hat-shaped cross sections forming a central portion spaced from said outer side posts.

12. The sidewall assembly according to claim 11 wherein said central portion and said composite panel form a flat, generally coplanar surface.

* * * * *